(12) United States Patent
Spanggaard

(10) Patent No.: US 10,012,449 B2
(45) Date of Patent: Jul. 3, 2018

(54) INLET STRATIFICATION DEVICE

(71) Applicant: Eyecular Technologies APS, Frederiksberg (DK)

(72) Inventor: Martin Spanggaard, Frederiksberg (DK)

(73) Assignee: Eyecular Technologies ApS, Frederiksberg (DK)

( * ) Notice: Subject to any disclaimer, the term of this patent is extended or adjusted under 35 U.S.C. 154(b) by 0 days.

(21) Appl. No.: 15/124,285

(22) PCT Filed: Mar. 12, 2015

(86) PCT No.: PCT/DK2015/050050
§ 371 (c)(1),
(2) Date: Sep. 7, 2016

(87) PCT Pub. No.: WO2015/135551
PCT Pub. Date: Sep. 17, 2015

(65) Prior Publication Data
US 2017/0016682 A1     Jan. 19, 2017

(30) Foreign Application Priority Data
Mar. 14, 2014 (DK) .................................. 2014 00140

(51) Int. Cl.
*E03B 11/00* (2006.01)
*F28D 20/00* (2006.01)

(52) U.S. Cl.
CPC .. *F28D 20/0039* (2013.01); *F28D 2020/0069* (2013.01); *Y02E 60/142* (2013.01)

(58) Field of Classification Search
CPC .......... F28D 20/0039; F22D 7/04; F22D 7/00; F22B 5/04; Y02E 60/142

USPC ...................................... 122/14.3, 14.31, 429
See application file for complete search history.

(56) References Cited

U.S. PATENT DOCUMENTS

| | | | | |
|---|---|---|---|---|
| 5,341,770 A | * | 8/1994 | Lannes | F24H 9/0042 122/19.2 |
| 7,392,766 B2 | * | 7/2008 | Jackson | F24D 19/083 122/13.01 |
| 8,567,388 B2 | * | 10/2013 | Humphreys | F24H 9/02 126/640 |

(Continued)

FOREIGN PATENT DOCUMENTS

| | | |
|---|---|---|
| DE | 27 22 888 A1 | 11/1978 |
| EP | 0 384 423 A1 | 8/1990 |
| WO | WO 02/39028 A1 | 5/2002 |

OTHER PUBLICATIONS

International Search Report and Written Opinion, PCT/DK2015/050050, dated Jul. 20, 2015.

(Continued)

*Primary Examiner* — Craig Schneider
*Assistant Examiner* — Angelisa L Hicks
(74) *Attorney, Agent, or Firm* — Winston & Strawn LLP

(57) ABSTRACT

An inlet stratification device for providing and maintaining stratification of a fluid in a tank. The stratification device includes a pipe of a flexible non-porous material, having a number of holes, with the pipe configured to contract and expand such that exchange of fluid through the holes of the pipe is substantially prevented in regions of the pipe where the temperature of the fluid inside the pipe is higher than the temperature of the fluid outside of the pipe.

21 Claims, 3 Drawing Sheets

(56) References Cited

U.S. PATENT DOCUMENTS

2007/0227468 A1* 10/2007 Gordon .................... F24H 1/18
122/13.01

OTHER PUBLICATIONS

2nd Written Opinion, PCT/DK2015/050050, dated Feb. 4, 2016.
Andersen E. et al., "Investigations of fabric inlet stratifiers for solar tanks," Proceedings of ISES Solar World Congress, Orlando Florida, USA (2005). (Abstract Only).
Göppert, Stefan et al., "Be-und Entladesysteme für thermische Schichten-speicher: Teil 1—Überblick", Chemie Ingenieur Technik, vol. 80, No. 3, pp. 287-293 (2008). (w/English Abstract).
Shah L. J. et al., "Theoretical and experimental investigations of inlet stratifiers for solar storage tanks," Applied Thermal Engineering, vol. 25, pp. 2086-2099 (2005).

* cited by examiner

INLET STRATIFICATION DEVICE

This application is a 371 filing of International Patent Application PCT/DK2015/050050 filed Mar 12, 2015, which claims the benefit of Danish application no. PA 2014/00140 filed Mar. 14, 2014.

BACKGROUND

The present invention relates to an inlet stratification device comprising an inlet stratification pipe, and to a method of manufacturing said inlet pipe.

Thermal storage have increasingly become important with regard to efficient energy heating, since it allows excess thermal energy to be collected for later use.

A key parameter in thermal heating systems is the stratification efficiency of the thermal energy storage device. Stratification in thermal energy storage is a natural phenomenon encountered in liquid storage systems such as water tanks above a temperature of 4° C. Due to buoyancy forces, hot water tends to accumulate at the top of a thermal energy storage, whereas colder water will always be forced to move downwards. Therefore, a thermal energy storage based on water will always show a certain amount of stratification.

Experimental and theoretical investigations have however showed that the overall system performance of a thermal energy storage, e.g. a solar heating system for domestic hot water preparation can be increased with an optimal thermal stratification in the solar storage compared to systems without stratified conditions in the storage.

Different factors tend to destroy the stratification. One example is mixing of water due to natural convection caused by buoyancy of hotter fluid that is surrounded by colder fluid, e.g. if the fluid inlet is hotter than the temperature at the position of the inlet or if a thermal energy storage is charged with an immersed heat exchanger. A different problem is by jet mixing (or plume entrainment) caused by the kinetic energy of the water entering the thermal energy storage or with thermal conduction and diffusion within the fluid itself, the thermal energy storage wall and components immersed in the fluid.

Accordingly, the ability to promote stratification during charging and discharging of the fluid in the storage device, is not only dependent on the construction of a storage device but also on any stratification enhancing devices present in the device. Therefore, the boundary conditions of the charging and discharging processes play a crucial role for the maintenance of any stratification efficiency.

Several different kinds of stratification devices are known today that aims at solving the above problems, wherein the stratification systems enable an inflow at variable heights of the storage device/tank.

The choice of the admission height of the charged fluid can take place through mechanical procedures or through gravitationally induced flow, where vertically installed tubes with free or lockable openings are used. Among these, are both rigid inlet stratifiers equipped with openings and 'non-return' valves, and flexible inlet stratification pipes mounted vertically in the storage tanks.

Rigid pipes are known e.g. from DE10320569 and DE102007046905. Experiments have however shown (see e.g. Shah L. J et al: *Theoretical and experimental investigations of inlet stratifiers for solar storage tanks*. Applied Thermal Engineering 2005; 25:2086-2099), that a rigid tube with a number of openings in different levels works more as a mixing device than a stratifying device, because cold water gets sucked into the stratifier especially through the lowest opening(s), thereby reducing the thermal performance significantly.

Several fabric stratification inlet pipes have been disclosed e.g. in WO2006084460. The fabric stratification inlet pipes will however behave as a filter for the liquid. All particles larger than the pores of the material, e.g. rust, dirt, various flaking and any other floating material in the fluid system, will be caught by the porous material. This will gradually block the pores in the fabric, and eventually disable the stratification capabilities of the stratifier completely. Also calcium carbonate sediments have a tendency of building up deposits in the pores in the fabric, again gradually blocking the pores, and eventually disabling the stratification capabilities of the stratifier completely.

The fabric stratification inlet pipes have been experimentally investigated, see e.g. Andersen E. et al, *Investigations of fabric inlet stratifiers for solar tanks*. Proceedings of ISES Solar World Congress, Orlando, Fla., U.S.A., 2005. The authors found that the one of the disadvantage of the fabric stratification inlet pipe, namely the high horizontal heat transfer through the very thin fabric, could be reduced when using fabric pipes consisting of two fabric layers instead of one fabric layer. However, this only has a tendency of adding to the problems that the fabrics will function as a filter, reducing the efficiency of the inlet stratification pipe during operation.

Thus, there is a requirement for providing a simple and inexpensive inlet stratification device, which is consistently reliable during use and which ensures that the fluid can be delivered to the correct thermal layer in the storage tank without causing any unnecessary turbulence and/or heat exchange between the layers.

SUMMARY OF THE INVENTION

It is a first aspect of the present invention to provide a inlet stratification device arranged for thermally stratifying the inlet fluid in a thermal storage tank in order to increase the thermal performance of the storage tank and/or the heating system, and without providing inflows and outflows with inherent turbulence and agitation of the stratified layers.

It is a second aspect of the present invention to provide a stratification inlet pipe arranged for enable an inflow at variable heights in a storage device.

It is a third aspect of the present invention to provide an inlet stratification device, which can be used with existing thermal storage tanks.

It is a fourth aspect of the present invention to provide a method for manufacturing the inlet stratification pipe in a simple and inexpensive way.

It is a fifth aspect of the present invention to provide an inlet stratification device that can be used for space heating, domestic hot water, process heat etc.

It is a sixth aspect of the present invention to provide a simple inlet stratification device, which is simple to install, use and maintain.

The novel and unique features whereby these and further aspects are achieved according to the invention is the fact that the inlet stratification device comprises at least one inlet pipe made at least partly of a flexible non-porous material, said pipe comprises a number of holes, and is being configured to contract and expand such that exchange of fluid through the holes of the pipe is substantially prevented in regions of the pipe, where the temperature of the fluid inside the pipe is higher than the temperature of the fluid outside the pipe.

The inlet stratification device are preferably arranged for circulating a fluid having a vertical temperature gradient through a storage tank, and it is preferred that said inlet pipe is arranged vertically in the storage tank. The flow of fluid from the pipe is constrained from mixing with the fluid in the storage tank until, by virtue of the forces on the inlet pipe created by the density difference between the fluid in the tank and the fluid in the inlet pipe, the fluid moves to the layer within the tank at or close to the temperature of the fluid emerging from the inlet pipe.

Using a flexible pipe arranged for expanding/unfolding or collapsing will lead to an equalization of the pressure in the pipe and in the tank, ensuring that inflow and outflow through the holes in the pipe are prevented until a level of equal densities and thus temperatures in the pipe and the tank are reached. Thus, the fluid in the pipe will not enter the tank until it either reaches the top of the pipe, where it is forced to leave the pipe, because new fluid is constantly fed into the pipe, or when the temperature of the fluid in the pipe equals the temperature of the fluid in the tank leading to a slightly higher hydrostatic pressure in the pipe than in the tank. The pipe will expand in an attempt to equalize the pressure difference, but the expansion is limited by the expansion properties of the pipe which leads to a flow of fluid from the pipe into the tank at the right temperature level.

The inlet pipe is advantageously placed vertically in the storage tank in a "stretched condition", whereby it is ensured that wrinkles and/or folds, which could have an impact on the opening/closing functioning of the holes, will not occur during operation.

Within the context of the present invention, the term "flexible material" means any kind of material arranged for expanding/unfolding and collapsing in response to the temperature/density of the fluid in the pipe and tank. It is preferred that the material cannot creep more than about 5%, preferably even less, and that the inlet pipe is arranged in the tank in a way that substantially prevents the material from creeping during operation.

The term "non-porous material" means materials without pores, or similar small openings/channels, in which particles and/or sediments present in the fluid can be held back. It is in this respect preferred that the material is configured such that at least 98%, preferably all of the fluid in the inlet pipe, will enter into the surrounding tank via the holes in the pipe, thereby automatically excluding materials such as fabrics or other filter materials.

Preferred flexible non-porous materials meeting the above definitions are for example polymer films e.g. made of ethylene tetrafluoroethylene (ETFE), a fluorine based plastic having a high corrosion resistance and strength over a wide temperature range, polyvinylidene difluoride (PVDF), a non-reactive thermoplastic fluoropolymer, polypropylene (PP), or modified polytetrafluoro-ethylene (mPTFE), a fluoropolymer film that is an excellent choice for applications that require extreme chemical conditions and/or high temperature resistance. However, inlet pipes made completely or partly of other flexible non-porous materials such as metal and/or silicone films are also contemplated within the scope of the present invention. The person skilled in the art will understand that the flexible non-porous material of choice depends on the physical and chemical conditions in the storage tank. E.g. will a storage tanks for solar energy require materials that can withstand higher temperatures, than materials used for an inlet pipe used in a conventional energy system.

In a preferred embodiment the cross-sectional shape of the inlet pipe in it's expanded position has a substantially circular shape, as this has proven to provide a simple and inexpensive embodiment. However, other cross-sectional shapes are also contemplated within the scope of the present invention, e.g. oval or polygonal shapes.

The thickness of the material is preferably selected in order to ensure that the required flexibility of the pipe is provided and at the same time, that the heat transfer through the wall of the pipe is held to a minimum. Accordingly, a preferred thickness of the walls of the pipe is in the range around 10-100 μm, preferably between 20 and 50 μm, and even more preferred around 25 μm. The person skilled in the art will however understand, that the thickness could be higher or lower depending on the used material.

In order to reduce the heat loss through the walls of the pipe, the inlet pipe could in a preferred embodiment comprise more than one layer. Said layers could e.g. be placed at a distance from each other, as described e.g. in WO2006084460 for a fabric inlet stratification device, ensuring that the distance between the layers will function as a thermal insulation layer. In an alternative embodiment the layers bear against each other, also providing an insulation effect, and/or the inlet pipe could comprise part of one or more additional layers in certain sections.

The holes in the pipe are preferably arranged at different vertical heights and with a predetermined vertical distance to allow the exchange of fluid in all relevant and desired vertical thermal layers of the storage tank. Preferably the holes are arranged in a single row in the pipe, thereby providing a very simple and inexpensive embodiment, however several rows or single holes displaced throughout the vertical height of the pipe is also contemplated within the scope of the present invention, the only requirement being, that the holes are distributed in the vertical direction of the pipe (when the pipe is arranged in the storage tank), such that they individually can be closed when the temperature of the surrounding fluid in the tank is lower than the temperature of the fluid inside the pipe, and individually opened when the fluid in the inlet pipe has reached the thermal layer where there is no temperature difference and thus no pressure difference. At this level the pipe will expand and the holes will open and the inlet fluid will be forced to flow into the correct thermal layer.

Each hole of the inlet pipe has a size that allows particles and/or sediments present in the fluid to pass through without difficulties, such that the holes are not clogged. It is furthermore preferred that the holes in the expanded stage, i.e. when fluid is allowed to flow out of the pipe and into the tank, are elongated or having the shape of a double convex lenses, as these shapes have proven to open and close fast in response to the temperature of the fluid in the pipe and in the tank, respectively.

In order to ensure that the holes of the inlet pipe are closed effectively, it is preferred that the inlet pipe comprises a sealing area around each hole that will ensure that holes are closed effectively where the walls of the inlet pipe lay flat against each other, such that fluid being transported to higher thermal layers cannot escape through the respective hole. It is in this respect preferred that the inlet pipe has a substantially drop-shaped cross section, when a hole is closed. Said drop shape will also reduce the heat loss through the walls of the pipe, as the surface area of the pipe in which fluid can flow, is substantially reduced.

It is in this respect preferred that the sealing area involves at least 10% of the walls in a given cross section of the inlet pipe, preferable at least 20%. However, the desired sealing area will depend on the kind of material used, the flow rate through the inlet pipe and/or thermal storage fluid.

In order to overcome the static attraction in the sealing area that might occur when the holes in the pipe are closed, the inlet pipe can comprise reinforcement means arranged for ensuring that the holes easily can be opened when there is no temperature difference between the fluid in the pipe and in the tank. Said reinforcement means can in one embodiment be one or more rods extending in substantially the whole length of the pipe, one or more ribs e.g. placed at intervals in an area opposing a single row of holes, and/or stitching or welding made strategically in the inlet pipe. If said reinforcement means are made of a heat insulating material, e.g. silicone, a reduced heat loss is also provided.

In addition, or as an alternative, to the reinforcement means it is preferred that the inlet opening of the pipe is connected to an oval inlet tube, which will ensure that the fluid flow inside the pipe will contribute to a simple and effective opening and closing of the holes. It is expected that this is due to the shape of the fluid column in the inlet pipe. Said oval inlet pipe will also contribute to providing the desired drop-shaped cross section of the pipe.

The present invention also relates to a method of manufacturing the inlet stratification pipe according to the present invention. Said method comprises providing an inlet pipe made at least partly of a non-porous flexible material, and providing holes in said pipe.

The inlet pipe can either be made entirely of the non-porous flexible material, or be made partly of a rigid material to which the non-porous flexible material has been attached. The only requirement being that the non-porous flexible material must constitute a portion of the pipe such that it is ensured that each hole in the flexible material can close when the temperature of the surrounding fluid is lower than the temperature of the fluid inside the inlet pipe, and open when there is no temperature difference and thus no pressure difference between the fluid in the pipe and tank.

In a very simple and inexpensive embodiment the inlet pipe is obtained by providing a sheet and/or film of a substantially rectangular non-porous flexible material, and assembling the longitudinal edges of the rectangular non-porous flexible sheet in the complete length of the two edges, e.g. by sealing or welding, providing a joined edge.

The holes could either be made in the sheet/film during manufacturing or before the sheet/film is being folded, but could also be provided by cutting and/or punching sections out in the pipe after the sheet has been assembled. In this situation it is preferred that the holes are made by removing sections in the joined edge, such that the joined edge after the sections has been removed, is only joined point wise. When said removed sections resemble plano-convex-lenses, the holes will, in the expanded stage, resemble double convex lenses, which have proven to be especially advantageously in experiments.

Other ways of providing the holes, are also contemplated within the scope of the present invention, e.g. by assembling the longitudinal edges of the rectangular non-porous flexible material point wise in order to provide holes as circular recesses along the joint edge.

In an alternative embodiment, the inlet pipe is obtained by providing two or more substantial rectangular sheet/films of a non-porous flexible material, and joining these to each other to provide the inlet pipe. In this way it is also possible to replace a part of the flexible pipe with a rigid section in order to provide reinforcement means. The holes in the flexible material can advantageously be provided as discussed above.

BRIEF DESCRIPTION OF THE DRAWINGS

The invention will be explained in greater detail below, describing only exemplary embodiments of the inlet stratification device according to the invention, in which.

DETAILED DESCRIPTION OF THE INVENTION

The present invention relates to an inlet stratification device, for thermal storage of energy in a fluid.

Figure 1A:
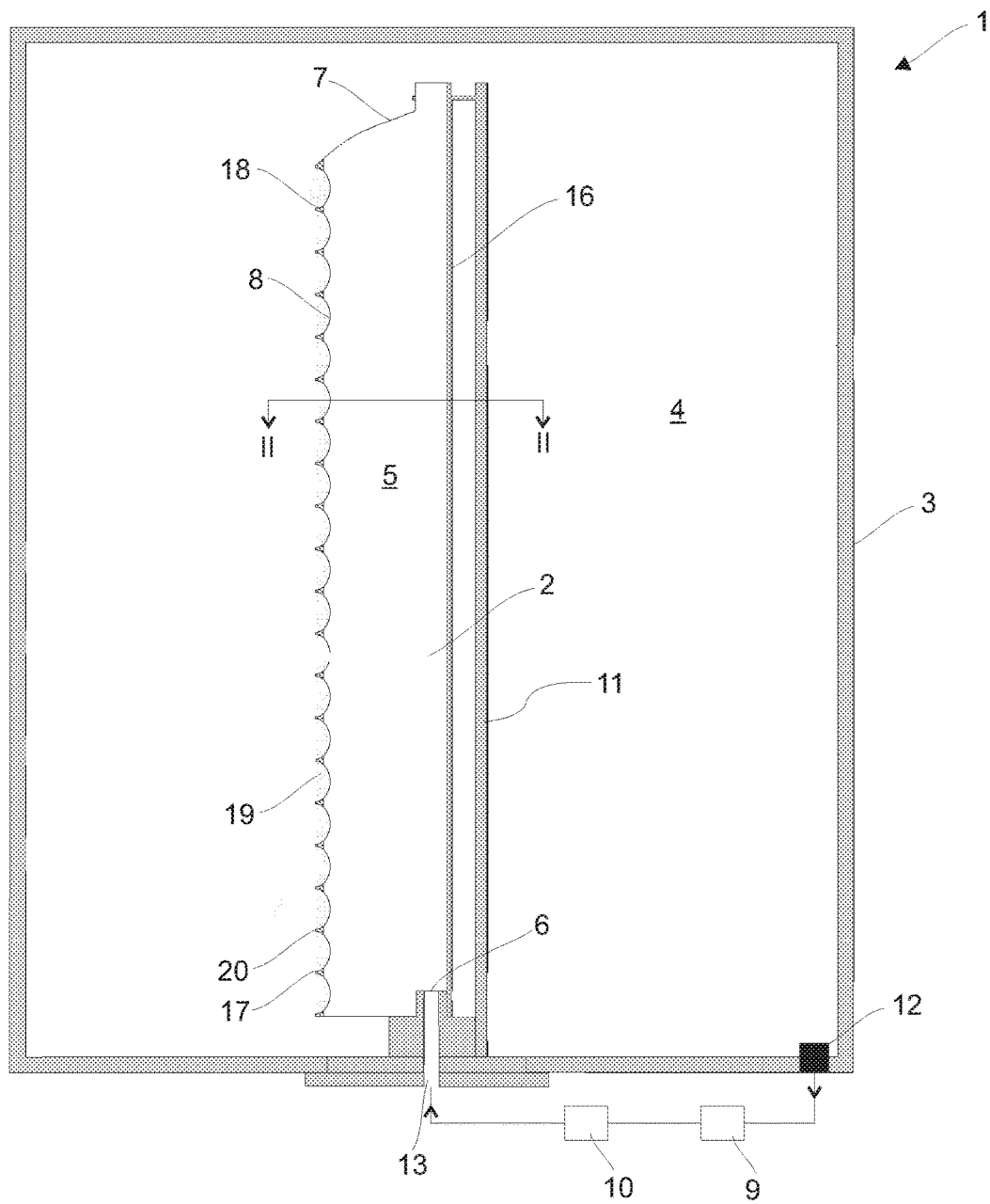
FIG. 1a is a schematic view of a first embodiment of an inlet stratification device according to the invention.

FIG. 1a shows a schematic view of a first embodiment of an inlet stratification device 1 according to the invention. The inlet pipe 2 is arranged vertically in a thermal storage tank 3 comprising a thermal storage fluid/liquid 4, e.g. water, by means of a rigid construction 11. It should be noted that it is not important how the inlet pipe 2 is arranged in the tank, as long as it remains in the vertical position.

Figure 1B:
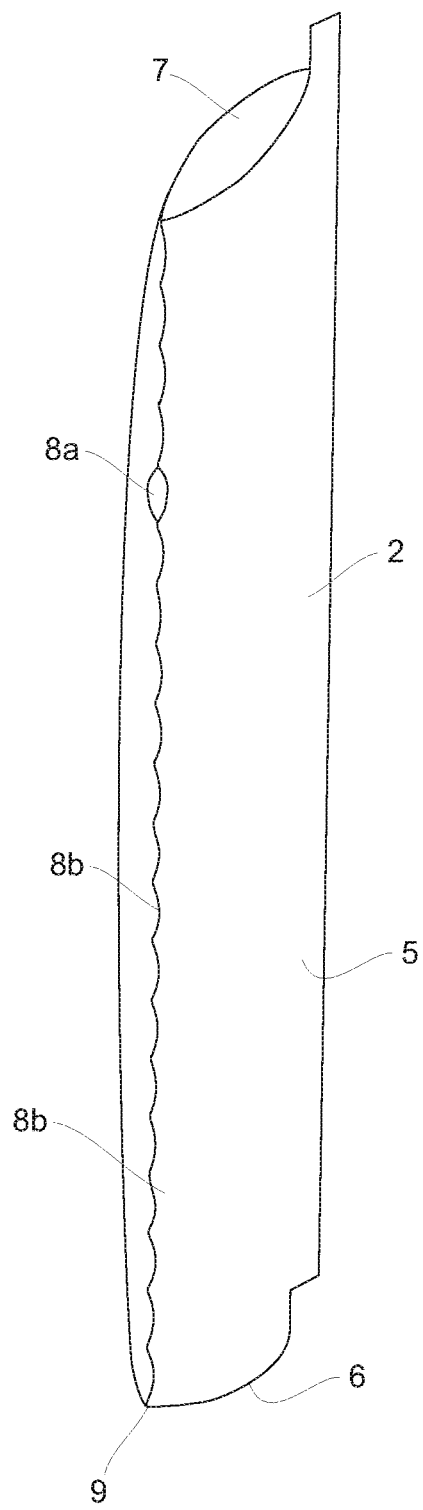
FIG. 1b, is a perspective view of the inlet pipe shown in FIG. 1a, FIG. 2 shows a cross section of the inlet pipe in FIG. 1a taken along the lines II-II, in which a hole in the pipe is closed.

The inlet pipe 2, which is also shown in perspective in FIG. 1b, is made of a non-porous flexible material 5 and comprises an inlet opening 6, an optional top opening 7 and a number of holes 8 arranged in a single row in the longitudinal direction of the pipe 2.

The tank 3 is connected to one or more heating devices 9, such as a solar collector, which comprises a heat exchanger or absorber for transmitting the thermal energy produced in the heating device to the thermal storage liquid 4. A pump 10 provides circulation of the in the heating system, from an opening 12 at the bottom of the tank 3, where the liquid is coldest, through an outlet pipe (not shown) to the heat exchanging device 9, and from there in its heated condition back to the thermal storage tank 3 through an inlet opening 13 and into the inlet opening 6 of the inlet pipe 2. If the system has natural convection, e.g. if the heat exchanging device 9 or a heating device were placed inside the storage tank, there would be no need for a circulation pump.

The heated water then flows upwards inside the inlet pipe 2 whereby the heated water will be thermally stratified.

Since the inlet pipe 2 is made of a non-porous flexible material the pipe will expand and/or collapse leading to an equalization of the pressure in the pipe 2 and in the tank 3, ensuring that inflow and outflow through the holes 8 in the pipe are prevented until equal densities and thus temperatures in the pipe 2 and the tank 3 are provided. In FIG. 1b, a single hole 8a is shown in its opened position, allowing water to flow into the tank, whereas the remaining holes 8b, are all closed. The opened hole 8a has a substantially double convex lens shape, whereas the holes 8b, has a substantially plano-convex-lens-shape.

Figure 2:
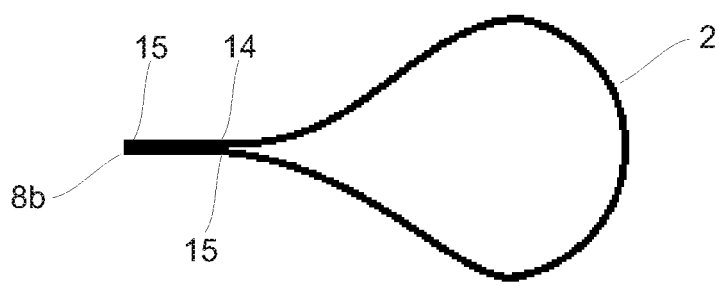

FIG. 2 shows a cross section of the pipe 2 in FIG. 1 taken along the lines II-II in which the temperature of the liquid inside the pipe is different from the temperature of the liquid outside the pipe, i.e. in the tank 3. As is evident from FIG. 2, the pipe comprises a sealing area 14 where the walls 15 of the inlet pipe 2 are allowed to lay flat against each other, such that liquid in the inlet pipe 2 having a different temperature than the surrounding fluid, i.e. the respective hole 8b is closed. Said sealing area 14 takes up at least 10% of the wall of a given cross section of the inlet pipe 2, preferably more, thereby preferably providing a drop-shaped cross section of the pipe, when the hole is closed.

Figure 3:
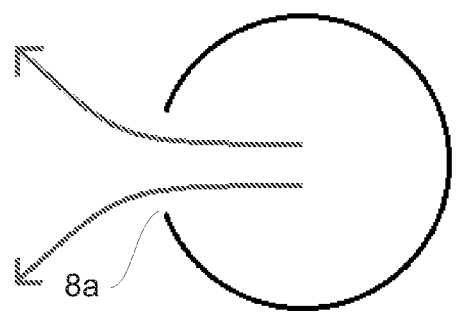
FIG. 3 shows a cross section of the inlet pipe in FIG. 1a taken along the lines II-II, in which a hole in the pipe is open.

FIG. 3 shows the same cross section as FIG. 2, but where the temperature of the fluid in the pipe 2 equals the temperature of the fluid in the tank 3 leading to a slightly higher pressure in the pipe 2 than in the tank due to the upward going force caused by the flow of inlet water. The pipe will expand/unfold in an attempt to equalize the pressure difference, but the expansion is limited by the extension of the pipe whereby the hole 8a will be forced opened, and fluid will be allowed to flow from the pipe 2 into the tank 5 at the right temperature layer.

Accordingly, the liquid in the pipe 2 will not enter the tank 3 until it either reaches the layer when the temperature of the fluid in the pipe equals the temperature of the liquid in the tank leading to a slightly higher pressure in the pipe than in the tank or through the top opening 7 of the pipe (if present), where it is forced to leave the pipe, because new water is constantly fed into the pipe 2.

The inlet pipe 1 shown in FIGS. 1 to 3 has been manufactured by folding a rectangular film of a non-porous flexible material 5 around its central axis 16 such that the two longest edges 17 of the rectangle meets. After the film has been folded, the overlapping edges 17 are joined together, e.g. by welding, thereby providing a single joined edge 18. Hereafter are sections 19 of a plano-convex-lens-shape removed from the joined edge 18 using e.g. a punching technique. The created openings in the joined edges define a single row of holes 8, separated by a number of connections points 20. In this way the inlet pipe is being configured to easily contract and expand and wherein the joint edge 18 provides a part of the sealing area 14, which will assist in bringing the walls of the pipe to lay flat against each other in the sealing area.

Figure 4:
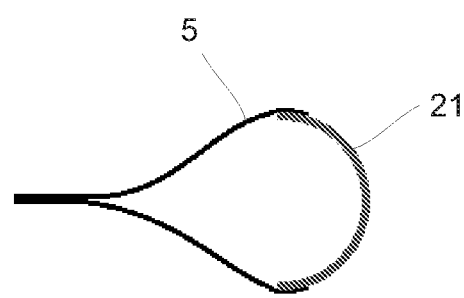
FIG. 4 shows a cross section of a second embodiment of the inlet pipe according to the invention.

A second embodiment of the invention can be seen as a cross section in FIG. 4 in which the inlet pipe is made partly of a non-porous flexible material 5 and partly of a rigid material 21 to which the non-porous flexible material has been secured. In the embodiment shown, the ratio of the rigid material to flexible material is around 30/70, however said ratio could just as easily be different e.g. 40/60; 50/50 or 70/30, the only requirement being that the non-porous flexible material 5 must constitute a portion of the pipe 2 sufficient to allow the holes 8 in the flexible material to close when the temperature of the surrounding fluid is lower than the temperature of the fluid inside the inlet pipe, preferably also such that a sealing area 14 of at least 10% of the cross sectional diameter can be provided.

EXAMPLE

An example of an inlet pipe 2 corresponding to the one shown in FIGS. 1 to 3 was made by providing a rectangular film of ethylene tetrafluoroethylene having a thickness of 25 µm and measuring 17 cm×120 cm. Said film was folded along the longitudinal middle, such that the two longest sides of the rectangle were aligned. The overlapping edges were then welded together, and sections of a plano-convex-lens-shape was removed from the overlapping edge using a punching technique. The height of each plano-convex-lens, i.e. each hole, is 50 mm and connection points (at the largest distance) between each hole is 10 mm. The radius of curvature of the plano-convex-lens-shape is 75 mm.

Said inlet pipe has a simple and inexpensive design, and can therefore be used equally well for both domestic and industrially hot water storage and other types of heating. The stratification device may be designed to allow more than one source of heat to feed the thermal storage medium, for example, solar thermal, a heat pump and a gas boiler as backup. Also, there may be several "consumers" to draw fluid from the thermal store such as radiators, under-floor heating, heat exchangers for swimming pools and plate heat exchangers for hot water preparation.

Modifications and combinations of the above principles and designs are foreseen within the scope of the present invention.

What is claimed is:

1. An inlet stratification device for providing and maintaining thermal stratification of a fluid that is introduced into a storage tank through the device, the inlet stratification device comprising at least one inlet pipe made at least partly of a flexible non-porous material film that has a number of holes, with the material of the pipe configured to contract and expand in response to temperatures in the tank and pipe, respectively, such that exchange of fluid through the holes of the pipe is substantially prevented in regions of the pipe where the temperature of the fluid inside the pipe is higher than the temperature of the fluid outside the pipe due to contraction of the non-porous flexible material which causes the walls of the pipe surrounding the holes to collapse and lay flat against each other to effectively close the holes.

2. An inlet stratification device according to claim 1, wherein the inlet pipe in the expanded position has a substantially circular cross-sectional shape.

3. An inlet stratification device according to claim 1, wherein the pipe is arranged vertically in the storage tank and the holes are provided at different vertical heights and the pipe has a predetermined vertical distance to allow exchange of fluid at different vertical thermal layers of the stratification device.

4. An inlet stratification device according claim 1, wherein the holes are dimensioned such that floating material in the fluid will not get caught in said holes.

5. An inlet stratification device according to claim 1, wherein the holes are arranged as a single row in the pipe.

6. An inlet stratification device according to claim 1, wherein the inlet pipe comprises a sealing area around at least one of the holes in the pipe, with the sealing area arranged for ensuring that said at least one hole is closed effectively.

7. An inlet stratification device according to claim 1, wherein the inlet pipe comprises two or more layers of flexible non-porous material, either bearing against each other or placed at a distance from each other.

8. An inlet stratification device according to claim 1, wherein the inlet pipe is made of a polymer film, a metal film or a silicone film.

9. An inlet stratification device according to claim 8, wherein the inlet pipe is made of a polymer film comprising one or more of ethylene tetrafluoroethylene, polyvinylidene difluoride, polypropylene or modified polytetrafluoroethylene and having a wall thickness of 10-100 µm.

10. An inlet stratification device according to claim 1, wherein the inlet pipe comprises at least one reinforcement means arranged for ensuring that the holes easily can be opened when there is no temperature difference between the fluid in the pipe and in the tank.

11. An inlet stratification device according to claim 10, wherein the reinforcement means comprises one or more rods extending in substantially the whole length of the inlet pipe, one or more ribs, stitching(s) or welding(s).

12. An inlet stratification device according to claim 1, wherein the inlet pipe consists partly of a flexible non-porous material and partly of a rigid material, with longitudinal edges of the flexible non-porous material attached to longitudinal edges of the rigid material.

13. An inlet stratification device according to claim 12, wherein the longitudinal edges of the flexible non-porous material are attached point wise to the longitudinal edges of the rigid material, such that the holes are provided along the attached edges.

14. A method of providing an inlet stratification device comprising at least one inlet pipe made at least partly of a flexible non-porous material film that has a number of holes, with the pipe configured to contract and expand such that exchange of fluid through the holes of the pipe is substantially prevented in regions of the pipe where the temperature of the fluid inside the pipe is higher than the temperature of the fluid outside the pipe, which comprises providing the inlet stratification device by providing holes in an inlet pipe made at least partly of a non-porous flexible material and so that the inlet stratification device, when introduced into a storage tank, provides and maintains thermal stratification of a fluid that is introduced into the storage tank through the device and substantially preventing exchange of fluid through the holes of the pipe in regions of the pipe when the temperature of the fluid inside the pipe is higher than the temperature of the fluid outside the pipe due to contraction of the non-porous flexible material which causes the walls of the pipe surrounding the holes to collapse and lay flat against each other to effectively close the holes.

15. A method according to claim 14, wherein the inlet pipe is formed from a substantially rectangular non-porous flexible material by overlapping and joining longitudinal edges of that material along its complete length, thereby providing an overlapping joined edge.

16. A method according to claim 15, wherein the holes in the pipe are provided by removing sections of the overlapping joined edge such that the edges are joined point wise.

17. A method according to claim 16, wherein the removed sections resemble piano-convex-lenses, such that the holes in the expanded stage, resemble double convex lenses.

18. A method according to claim 15, wherein the longitudinal edges of the rectangular non-porous flexible material are joined point wise in order to provide holes as circular recesses along the joined edge.

19. A method according to claim 14 wherein the inlet stratification device is provided in a hot water storage or heating unit for stratification of fluid therein.

20. In a storage tank, the improvement which comprises an inlet stratification device for providing and maintaining thermal stratification of a fluid that is introduced into a storage tank through the device, the inlet stratification device comprising at least one inlet pipe made at least partly of a flexible non-porous material having a number of holes, wherein the pipe is arranged vertically in the storage tank and the holes are provided at different vertical heights and the pipe has a predetermined vertical distance to allow exchange of fluid at different vertical thermal layers of the stratification device, with the pipe configured to respond to temperatures in the tank and pipe, respectively, to contract to a contracted position and expand to an expanded position such that inflow and outflow of fluid through the holes of the pipe is substantially prevented due to closure of the holes in regions of the pipe where the temperature of the fluid inside the pipe is higher than the temperature of the fluid in the tank outside the pipe wherein the walls of the pipe are surrounding the holes collapse and lay flat against each other to effectively close the holes, while ensuring that inflow and outflow of fluid through the holes of the pipe is allowed after the pipe expands to open the holes when the temperatures of the fluid in the pipe and the tank are equal.

21. The storage tank of claim 20, wherein the inlet pipe is made of a polymer film having a wall thickness of 10-100 μm, with a stretched, flattened shape in the contracted position and with a substantially circular cross-sectional shape in the expanded position, wherein the inlet pipe is arranged vertically in the storage tank with the holes are arranged in a single row in the pipe and at different vertical heights, and wherein the inlet pipe comprises a sealing area around at least one of the holes in the pipe, with the sealing area arranged for ensuring that said at least one hole is closed effectively.

* * * * *